US005687292A

United States Patent [19]
Boda et al.

[11] Patent Number: 5,687,292
[45] Date of Patent: Nov. 11, 1997

[54] DEVICE AND METHOD FOR DETERMINING A DISTRIBUTION OF RESOURCES OF A PHYSICAL NETWORK

[75] Inventors: Miklos Boda, Stocksund, Sweden; Tamás Szécsy, Budapest, Hungary; Soren Blaabjerg, Allerod, Denmark; József Bíró, Bonyhad-Mazos, Hungary; József Vass, Budapest, Hungary; Tibor Trón, Budapest, Hungary; András Faragó, Budapest, Hungary

[73] Assignee: Telefonaktiebolaget LM Ericsson, Stockholm, Sweden

[21] Appl. No.: 456,685

[22] Filed: Jun. 1, 1995

[30] Foreign Application Priority Data

Jun. 13, 1994 [SE] Sweden ................................ 9402060
Mar. 8, 1995 [SE] Sweden ................................ 9500838

[51] Int. Cl.$^6$ .............................. H04Q 3/00; G06F 15/18
[52] U.S. Cl. .................................................. 395/11; 395/22
[58] Field of Search ...................... 370/54, 17; 395/909, 395/11, 22, 23

[56] References Cited

U.S. PATENT DOCUMENTS

| | | | |
|---|---|---|---|
| 4,999,833 | 3/1991 | Lee | 395/909 |
| 5,166,927 | 11/1992 | Iida et al. | 395/22 |
| 5,195,170 | 3/1993 | Eberhardt | 395/11 |
| 5,263,121 | 11/1993 | Melsa et al. | 395/22 |
| 5,303,328 | 4/1994 | Masui et al. | 395/11 |
| 5,319,737 | 6/1994 | Reibling et al. | 395/22 |
| 5,404,423 | 4/1995 | Uchiyama et al. | 395/22 |

FOREIGN PATENT DOCUMENTS 9403035-0   6/1995   Sweden .

OTHER PUBLICATIONS

H.E. Rauch and T. Winarske, "Neural Networks for Routing Communication Traffic," IEEE Control Systems Mag., pp. 26–31, Apr. 1988.

A. Hiramatsu, "ATM Communications Network Control by Neural Networks," IEEE Trans. on Neural Networks, vol. 1(1), pp. 122–130, Mar. 1990.

A. Tarraf et al., "A Novel Neural Network Traffic Enforcement Mechanism for ATM Networks", IEEE Journal on Selected Areas In Communications, vol. 12, No. 6, Aug. 1994, pp. 1088–1096.

S. Kang et al., "A Trial Multilayer Perceptron Neural Network for ATM Connection Admission Control", IEICE Trans. Commun., vol. E76–B, No. 3, Mar. 1993, pp. 258–262.

A. Hiramatsu, "Integration of ATM Call Admission Control and Link Capacity Control by Distributed Neural Networks", IEEE Journal on Selected Areas in Communications, vol. 9, No. 7, Sep. 1991, pp. 1131–1138.

A. Faragó, "A Neural Structure as a Tool for Optimizing Routing and Resource Management in ATM Networks", Electronic Proceedings of the International Workshop on the Application of Neural Network in Telecommunication, Princeton, NJ, Oct. 18–20, 1993, pp. 1–5 w/attachments.

(List continued on next page.)

Primary Examiner—Robert W. Downs
Attorney, Agent, or Firm—Burns, Doane, Swecker & Mathis, L.L.P.

[57] ABSTRACT

A device for distributing resources of a given physical network among logical links by subdividing physical link capacities into logical links using an algorithm. The device comprises a first neural network, in which one part of the algorithm is implemented, and a second neural network, in which a second part of the algorithm is implemented, said two neural networks interworking to compute logical link capacities. Furthermore, a method for distributing resources of a given physical network among logical links by subdividing physical link capacities into said logical links is provided. More specifically, the method involves the use of a first neural network, in which one part of an algorithm is implemented, and a second neural network, in which a second part of an algorithm is implemented, said two neural networks interworking to compute logical link capacities so that the operation of the physical network, given an objective function, is generally optimized, according to the objective function.

33 Claims, 9 Drawing Sheets

OTHER PUBLICATIONS

A. Faragó et al., "Resource Separation – An Efficient Tool for Optimizing ATM Network Configuration", *Networks '94*, Sep. 1994, pp. 1–5 w/attachments.

D. Tank et al., "Simple 'Neural' Optimization Networks: An A/D Converter, Signal Decision Circuit, and a Linear Programming Circuit", *IEEE Trans. on Circuits and Systems*, vo. CAS–33, No. 5, May 1986, pp. 533–541.

M. Kennedy et al., "Unifying the Tank and Hopfield Linear Programming Circuit and the Canonical Nonlinear Programming Circuit of Chua and Lin", *IEEE Trans. on Circuits and Systems*, vol. CAS–34, No. 2, Feb. 1987, pp. 210–214.

A. Hiramatsu, "Integration of ATM Call Admission Control and Link Capacity Control by Distributed Neural Networks", *IEEE Global Telecommunications Conference & Exhibition*, vol. 2, 1990, pp. 1382–1386.

A. Chugo et al., "Dynamic Path Assignment for Broadband Networks Based on Neural Computation," *IEICE Trans. on Communications*, vol. E75–B, No. 7, Jul. 1992, pp. 634–641.

B.S. Cooper, "Selected Applications of Neural Networks in Telecommunication Systems – A Review," *Australian Telecommunication Research*, vol. 28, No. 2, 1994, pp. 9–29.

LBCN

DLPN

DEVICE AND METHOD FOR DETERMINING A DISTRIBUTION OF RESOURCES OF A PHYSICAL NETWORK

TECHNICAL FIELD OF THE INVENTION

The present invention relates to telecommunication networks and more particularly to distribution of resources of a physical network among logical links and the use of neural networks in this distribution process.

BACKGROUND ART

A main characteristic of a modern telecommunication network is its ability to provide different services. One efficient way of providing said services is to logically separate the resources of a physical network. On top of a physical network there is created a number of logical networks, each of which comprises nodes and logical links interconnecting the nodes. The logical links of the various logical networks share the capacities of physical links present in said physical network.

A physical network comprises switches, physical links, connecting said switches, and various auxiliary devices. A physical link comprises transmission resources, such as fiber optic conductors, coaxial cables and radio links. There are access points to the physical network, to which access points access units such as telephone sets and computer modems are connected. A physical link has limited transmission capacity. Information, such as voice, audio and data, is transported in logical networks by means of different bearer services. Examples of bearer services are STM 64 (Synchronous Transmission Mode with standard 64 kbit/s), STM 2 Mb (Synchronous Transmission Mode with 2 Mbit/s) and ATM (Asynchronous Transmission Mode). From a service network, such as POTS (Plain Old Telephony System) and ISDN (Integrated Services Digital Network) a request is sent to a logical network that a connection should be set up in the corresponding logical network.

A logical representation of a physical switch is commonly referred to as a node. To each node in each logical network there is usually associated a routing table, which is used to route a requested connection from node to node in the particular logical network starting from the terminal that originates the connection request and ending at the terminal which terminates said connection. The logical networks can be configured by the network manager.

In our Swedish Patent Application 9403035-0, incorporated herein by reference there is described a method of creating and configuring logical networks.

An important tool in network management, particularly the management and dimensioning of large ATM networks, is the distribution of resources of the physical network among logical networks that share the capacity of the physical network. There are several advantages of logical resource separation:

Various service classes may have very different characteristics. Network management can be simplified if service classes are arranged into groups in such a way that only those of similar properties are handled together in a logical network;

Important structures such as virtual leased networks, required by large business users, are much easier to implement;

A Virtual Path (VP), a standardized element of ATM network architecture, can be considered as a special logical network;

The physical network operates more safely.

Although the physical network is given, it is necessary to decide how to distribute or partition said physical network resources into logical networks by subdividing physical link capacities into logical link capacities. A physical link is logically subdivided into one or more logical links, each logical link having an individual traffic capacity referred to as logical link capacity. There are several methods for configuring logical link capacities. In order to optimize the configuration of logical link capacities algorithms have been developed, with objectives such as minimizing call loss rate or maximizing link utilization. Since telecommunication networks, such as an ATM network, are very extensive, a considerable amount of logical links will exist, said links sharing the capacities of the physical network. Consequently, the computational complexity of the optimization algorithms is very high. If logical resource partioning is applied to large telecommunication networks and if conventional methods and devices, such as conventional computer systems and software are used to execute the optimization algorithms the computation process will be slow and take long time. The absence of fast computational structures for executing the algorithms makes it impossible to run real-time applications of the optimization algorithms, which in turn renders the complete network both inflexible and unsafe.

Artificial Neural Networks

Artificial neural networks can to some extent be regarded as a kind of parallel distributed processor imitating the biological neural networks of for example the human brain. It is not known how the human brain represent high-level information. However it is known that the human brain uses many rather slow units, called neurons, which are highly interconnected. The neuron is the basic unit of the human brain, and can be viewed as an analogue logical processing unit. The basic principle of operation of the neuron is relatively simple: The neuron accepts inputs from other neurons to which it is interconnected, and all of these inputs are added together. If enough active inputs are received within a certain time, i.e. if the added inputs have risen above a certain threshold value, then the neuron will trigger and produce an output. If, however, the added inputs do not reach said threshold value the neuron will remain in its passive state. The produced output is then transmitted to other interconnected neurons, now acting as input to these. In this manner the whole neural network operates on the basis of neurons receiving inputs, and possibly producing outputs, which in turn act as inputs to interconnected neurons. The interconnectivity of the neurons implies that the structure of the brain is intrinsically parallel, and that it should be able to represent and process information in parallel.

Like the human brain, artificial neural networks also contain a large amount of simple processing elements, neurons, interconnected to each other. In principle, neurons in artificial neural networks operate, with suitable modifications, in the same way as the neurons of the brain. There are two main properties of artificial neural networks, hereinafter referred to as neural networks, that make them attractive in many applications:

The capability of learning by training; and

The capability of solving computational problems, when these are implemented in neural networks which are used as parallel computational structures, with dramatically increased speed.

A neural network that is allowed to relax, after initialization, can converge to a stable state very fast. The inherently parallel structure of neural networks, in which a large amount of simple processing units share the work of solving complex tasks, offers advantages in terms of speed and reliability. Neural networks have been applied in a wide range of areas, including pattern recognition, automatic control, traffic enforcement mechanisms and connection admission control.

RELATED TECHNIQUE

In the article entitled "A Novel Neural Network Traffic Enforcement Mechanism for ATM Networks" in IEEE Journal on Selected Areas in Communications, vol. 12, no. 6 (1994), a policing mechanism using neural networks is presented. The architecture of the mechanism is composed of two neural networks, the first of which is trained to learn the probability density function of "ideal non-violating" traffic, whereas the second neural network is trained to capture the "actual" characteristics of the "actual" offered traffic during the progress of the call. The output of the two neural networks is compared, and an error signal, that is used to shape the traffic back to its original values, is generated.

The paper "A Trial Multilayer Perceptron Neural Network for ATM Connection Admission Control" in IEICE Trans. Commun., vol. E76B, no. 3 (1993), proposes a multilayer perception neural network model as a control mechanism in order to perform ATM connection admission control. A so called neural estimator, utilizing the self-learning capability of neural networks, gradually learns the nonlinear relationships between network conditions and the observed quality of service values, and controls the traffic accordingly.

A method for adaptive link capacity control, and the integration of call admission control and link capacity control, by using neural networks is disclosed in the article entitled "Integration of ATM Call Admission Control and Link Capacity Control by Distributed Neural Networks" in IEEE Journal on Selected Areas in Communications, vol. 9, no. 7 (1991). At first neural networks are trained to estimate the call loss rate given the link capacity and observed traffic. Next, an objective function of the link capacity assignment optimization problem, constituted by the maximum call loss rate in the whole network, is implemented using neural networks. The objective function is optimized by a specific random optimization method based on the estimated call loss rate.

The article entitled "A neural structure as a tool for optimizing routing and resource management in ATM Networks" by A. Faragó in the Electronic Proceedings of the International Workshop on the Application of Neural Network in Telecommunication, Princeton, N.J., Oct. 18–20, 1993 relates to a two-layered neural structure with feedback for computing link blocking probabilities, given route-offered traffic rates and logical link capacities.

SUMMARY OF THE INVENTION

On top of a physical network, e.g. a telecommunication network and preferably an ATM network, a number of logical networks are established in which logical links share the capacities of physical links. The physical network resources, i.e. the transmission capacities of the physical links should be distributed or partioned among the logical links of said logical networks in an optimal way. A natural objective would be to globally optimize the operation of the complete physical network according to a given objective function. This optimization process usually involves the execution of an algorithm of great computational complexity. However, optimization using conventional methods and devices takes a very long time, thus rendering the operation of the complete network quite inflexible and unsafe.

An object of the present invention is the implementation of an algorithm for link capacity partioning into two interworking neural networks, said neural networks being used as parallel computational structures and being capable of executing said algorithm efficiently and with a dramatically increased speed.

Another object of the present invention is to provide a device for distributing resources of a given physical network among logical links by subdividing physical link capacities into said logical links using an algorithm. The device utilizes a first neural network, in which one part of the algorithm is implemented, and a second neural network, in which a second part of the algorithm is implemented, said two neural networks interworking to compute logical link capacities. The logical link capacities thus computed essentially optimize the operation of the complete physical network. Preferably, said algorithm has parameters describing the physical network, the topology of said logical links and traffic demands as input.

A further object of the present invention is to provide a method for distributing resources of a given physical network among logical links by subdividing physical link capacities into said logical links using an algorithm. Further, the method involves the use of a first neural network, in which one part of the algorithm is implemented, and a second neural network, in which a second part of the algorithm is implemented, said two neural networks interworking to compute logical link capacities so that the operation of said physical network, given an objective function, is generally optimized, according to said objective function. Preferably, said algorithm has parameters describing the physical network, the topology of said logical links and traffic demands as input.

Still another object of the present invention is to provide a network manager with the opportunity of running real-time applications of complex reconfiguration algorithms in order to enhance network flexibility and operational safety. This is achieved by realizing a hardware implementation of said neural networks.

BRIEF DESCRIPTION OF THE DRAWINGS

The novel features believed characteristic of the invention are set forth in the appended claims. The invention itself, however, as well as other features and advantages thereof, will be best understood by reference to the detailed description of the specific embodiments which follows, when read in conjunction with the accompanying drawings, wherein:

PREFERRED EMBODIMENTS OF THE INVENTION

Figure 1:
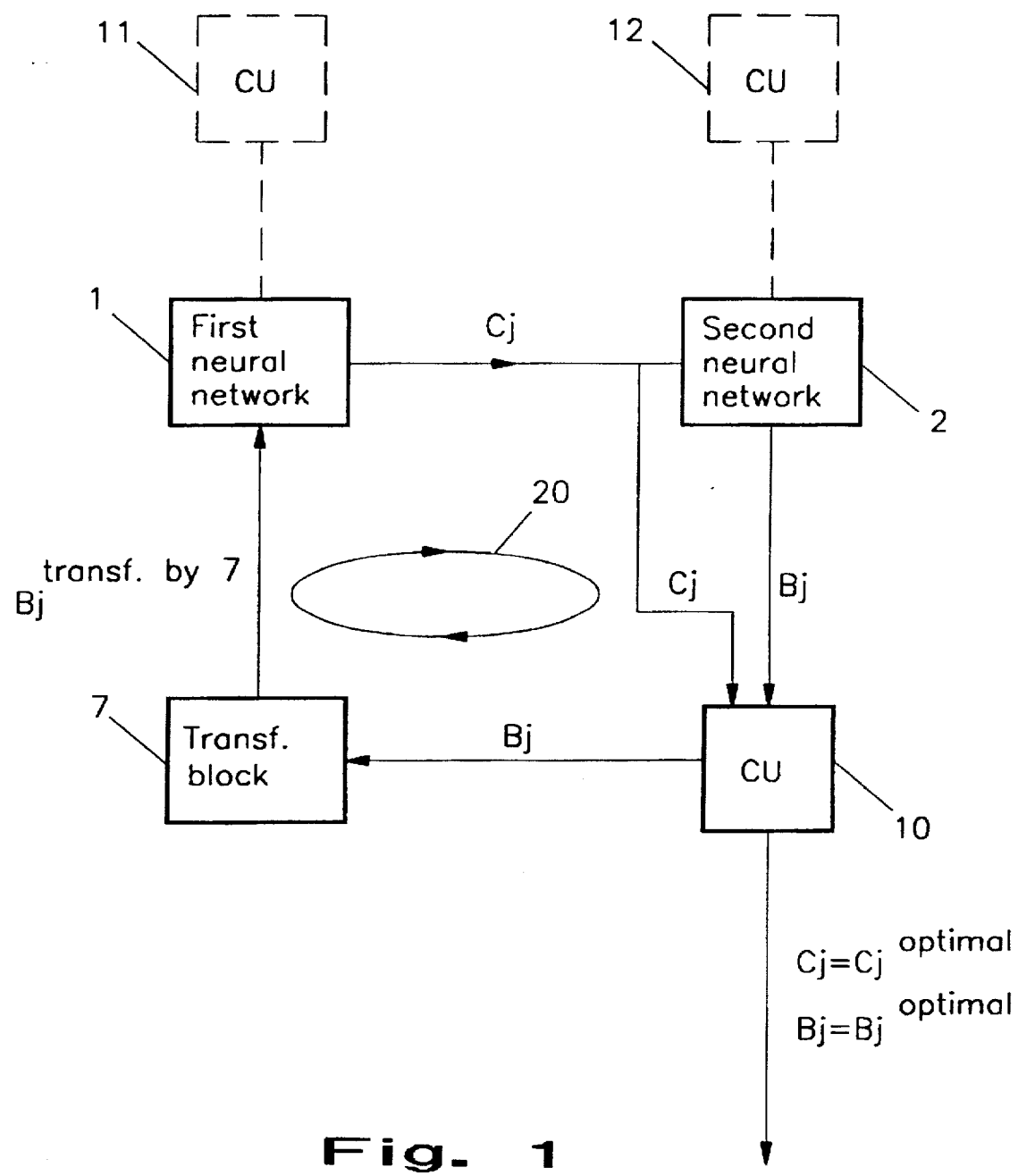
FIG. 1 is a schematic block diagram of a device in accordance with the present invention.

A physical network, preferably a large ATM network, with resources such as time slots, on top of which a number of logical networks are established, is considered. The physical resources, i.e. the transmission capacities of the physical links, have to be distributed among the logical links of said logical networks in some way. In this context, a natural objective is to optimize the operation of the complete physical network, as a family of logical networks, according to a given objective function.

In accordance with a preferred embodiment of the present invention, it is considered as a reasonable goal to achieve maximum carried traffic or to achieve maximum revenue. The advantages of using these quantities are that they are well expressed in analytical form and are also closely related to the practical aspects of network providers. In other words, the optimization task associated with link capacity partioning is to compute, given the traffic demand for each route in each logical network, logical link capacities so as to globally maximize the total carried traffic or network revenue.

Mathematical Framework

If there are J logical links in a physical network, and the capacity of an individual logical link j is denoted $C_j$, then the vector of said logical link capacities can be written as $C=(C_1, C_2, \ldots, C_3)$. Naturally, the sum of logical link capacities on the same physical link cannot exceed the capacity of the physical link. This physical constraint can be expressed as $$SC \leq C_{phys},$$

where C is defined above, and $C_{phys}$ refer to the vector of given physical link capacities. Furthermore, S is a matrix in which the j:th entry in the i:th row is equal to 1 if logical link j needs capacity on the i:th physical link, otherwise said entry is 0. In addition it is required that $C \geq 0$. Assume that there are a number, R, of fixed routes in said physical network. Traffic to each such route arrives as a Poisson stream of rate $v_r$. The streams belonging to different routes are assumed to be independent.

Assuming that links are independent, the carried traffic on route r can be expressed as $$v_r \prod_j (1-B_j)^{A_{jr}},$$

where $B_j$ is the blocking probability on logical link j, and $A_{jr}$ is the required capacity of link j by a call on route r. If route r does not traverse link j then $A_{jr}$ is equal to zero. It is thus assumed that the Poisson stream is thinned by a factor of $(1-B_j)^{A_{jr}}$ on each traversed link independently. The carried traffic on logical link j is $$\sum_r A_{jr} v_r \prod_i (1-B_i)^{A_{ir}},$$

which is actually the sum of the carried traffic on routes that traverse the link. This expression should be equal to $\rho_j(1-B_j)$, where $\rho_j$ is the aggregated offered load to logical link j thinned by the appropriate factor to obtain the carried traffic. This yields the equation $$\rho_j = (1-B_j)^{-1} \sum_r A_{jr} v_r \prod_i (1-B_i)^{A_{ir}}, \tag{1}$$

Furthermore $B_j$ depends on $\rho_j$ and $C_j$ according to Erlang's formula:

$$B_j = E(\rho_j, C_j) = \frac{\rho_j^{C_j}/C_j!}{\sum_{i=0}^{C_j} \rho_j^i/i!}. \tag{2}$$

The equations (1) and (2) together define a system of equations called the Erlang fixed point equations, which can also be formulated as $$B_j = E\left((1-B_j)^{-1} \sum_r A_{jr} v_r \prod_i (1-B_i)^{A_{ir}}, C_j\right). \tag{3}$$

If the logical link capacities are fixed, then the above system of equations (3) is known to have a unique solution.

The Algorithm

On the basis of this mathematical framework the total carried traffic in the physical network can be expressed by the following first objective function:

$$\sum_r v_r \prod_j (1-B_j)^{A_{jr}}$$

Accordingly, the objective is to maximize said first objective function with respect to said logical link capacities, subject to the physical constraints $SC \leq C_{phys}$ and $C \geq 0$, where the dependence of $B_j$ on $C_j$ is given by the Erlang fixed point equations (3). Note that revenue coefficients can be easily incorporated in said first objective function by using $v_r w_r$ and $A_{jr}/w_r$ instead of $v_r$ and $A_{jr}$, respectively. Here $w_r$ is the revenue coefficient parameter for route r, meaning that one unit of traffic on route r generates revenue $w_r$.

In the article entitled "Resource Separation—an Efficient Tool for Optimizing ATM Network Configuration" by A. Faragó, S. Blaabjerg, W. Holender, T. Henk, A. Szentesi, Z. Ziaja, in Networks '94, September 1994, an approximation of this task is described. For practical purposes said approximation is used herein. The approximation is based on the extension of said first objective function with a link utilization term, so that the resulting modified objective function becomes concave, making it possible to find the global optimum of said modified objective function. Link utilization, as well, is considered to be something to be increased in a telecommunication network, and under practical circumstances the added link utilization term is much smaller than the total carried traffic. Consequently, the modified objective function, i.e. the sum of the total carried traffic and the link utilization term, that we want to maximize, is closely related to said first objective function, and the modification causes negligible error for realistic values. In addition, the link utilization term of the modified objective function is approximated, said approximation being justified by the fact that its error tends to zero as the logical link capacities approaches infinity. Considering a large ATM network, the capacities are very large, indeed. Following this procedure, a simplified iterative method for the difficult optimization task of computing essentially optimal logical link capacities, based on sequential programming is obtained, the Erlang fixed point algorithm (EFP-algorithm):

Step 1. Set $B_j=0$ and $a_j=1$ for each j, where $a_j$ are weight values in the linear programming task of step 2;

Step 2. Solve the following linear task $$\text{Maximize } \Sigma a_j C_j,$$

subject to $SC \leq C_{phys}$ and $C \geq 0$ (note that $a_j$ depends on $B_j$). This step generates a set of values for the logical link capacities;

Step 3. Compute new values for the link blocking probabilities for each j using the Erlang fixed point equations $$B'_j = E\left( (1-B_j)^{-1} \Sigma_r A_r v_r \Pi_i (1-B_i)^{A_{ir}}, C_j \right). \quad (3)$$

where $C_j$ is the solution of the linear task in step 2;

Step 4. Set $a_j=-\log(1-B'_j)$ and $B'_j=B_j$ for each j, where $a_j$ is a logarithmic measure of link blocking;

Step 5. If the convergence conditions are satisfied then stop the algorithm, else repeat from step 2.

Note that the linear programming task in step 2 of the algorithm yields an optimal solution only if the link blocking probabilities with respect to the optimal logical link capacities are known. As mentioned above, the link blocking probabilities depend on the logical link capacities. In addition, the Erlang fixed point equations have a unique solution only if the logical link capacities are fixed. However, the logical link capacities are not fixed in advance, in fact, it is desired to optimize them. The Erlang fixed point algorithm overcomes this, by regarding the logical link capacities $C_j$ as fixed in each iteration step. Of course, from the viewpoint of the whole algorithm the capacities are not fixed parameters. Accordingly, both the optimal link blocking probabilities and the optimal logical link capacities can be iteratively approximated using the above algorithm until convergence is achieved with a required level of accuracy.

However, it can be seen that in every iteration of said algorithm a linear task has to be solved completely, so therefore step 2 of the above algorithm contributes significantly to the computational complexity of the whole algorithm. Also, the computation of the link blocking probabilities is a difficult task, since it leads to the task of solving a complicated nonlinear recursive system of equations which can be formulated in the form of the Erlang fixed point equations (3). To solve said linear programming task and said nonlinear recursive system of equations using conventional methods and devices would take long time, thus making it impossible to reconfigure the logical link capacities in real-time applications. Therefore, and in accordance with the present invention, neural networks operating very fast in parallel implementations are used to execute the EFP-algorithm.

Implementations into Neural Networks

In accordance with the present invention one part of said algorithm is implemented in a first neural network, and a second part of the algorithm is implemented in a second neural network, said two neural networks interworking to compute logical link capacities. The logical link capacities thus computed essentially optimize the operation of the complete physical network according to said approximated modified objective function.

In FIG. 1 there is shown a schematic block diagram of a device built in accordance with a general inventive concept. The device comprises a first neural network 1 and a second neural network 2. The first neural network 1, controlled by a first control unit (CU) 11, operates on said one part of said algorithm in order to compute a set of logical link capacities $C_j$. The set of logical link capacities q computed by the first neural network 1 is sent to the second neural network 2. The second neural network 2, controlled by a second control unit 12, operates on said second part of said algorithm in order to compute a set of link blocking probabilities $B_j$. Note that the obtained link blocking probabilities are computed with respect to the logical link capacities received from the first neural network 1. Next, both the set of logical link capacities q and the set of link blocking probabilities $B_j$ computed by the first neural network 1 and the second neural network 2, respectively, are sent to a main control unit 10. The main control unit 10, comprising conventional electronic devices such as processors and memory means, carries out a convergence test. If the convergence conditions are satisfied, the logical link capacities $C_j$ computed by the first neural network 1 essentially and globally optimize the operation of said physical network. The optimization is performed according to an objective function. In addition, the link blocking probabilities $B_j$ computed by the second neural network 2 are the link blocking probabilities with respect to the optimal logical link capacities. However, if the convergence conditions are not satisfied, the link blocking probabilities $B_j$ are sent to a transformation block 7 effecting a transformation of the link blocking probabilities. The transformation is shown in step 4 of said algorithm. Next, said transformed link blocking probabilities are sent to the first neural network 1, computing a new set of logical link capacities. The above computation steps are then repeated until the convergence condition is met. This process is iterative and is indicated by the loop shown at 20. Thus, the neural networks interwork in an iterative way, in which the neural networks operate alternately until the optimal logical link capacities are approximated with a required level of accuracy. The level of accuracy is preferably set by a network manager. If a high level of accuracy is selected then the number of iterations will increase and if a lower level of accuracy is selected a fewer number of iterations will take place.

Preferably, the first control unit 11 and the second control unit 12 are, in one practical implementation, incorporated into the main control unit 10.

The neural networks included in the device according to the invention and their interworking will be described in more detail below.

Figure 2:
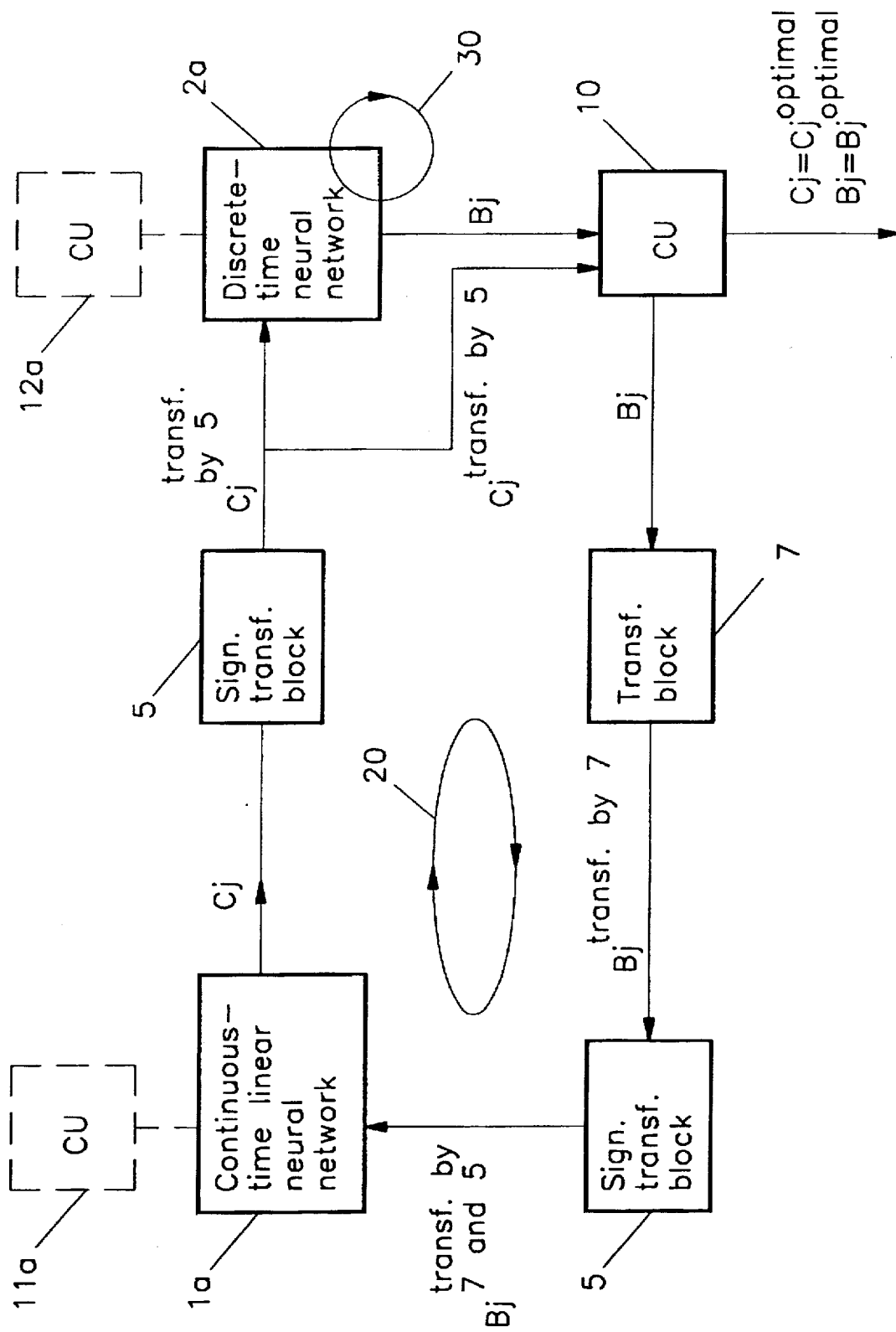
FIG. 2 is a block diagram of a first preferred embodiment of the present invention.

FIG. 2 is a block diagram, similar to FIG. 1, showing a first preferred embodiment of the present invention. The operation of the device is in general the same as that of FIG. 1. Two neural networks are interworking in an iterative manner generally as described above and as indicated by the loop at 20. The first neural network 1 is a continuous-time neural network 1a solving a linear programming task, and the second neural network 2 is a discrete-time neural network 2a solving a non-linear recursive system of equations. Preferably, the second discrete-time neural network 2a computes the link blocking probabilities $B_j$ iteratively, the iterative process being indicated by a circular arrow 30. Since a continuous-time neural network 1a and a discrete-time neural network 2a, are interworking, suitable signal transformations are required. These signal transformations are accomplished in a known manner by using a signal transformation block 5, comprising electronic devices such as analog-to-digital converters, digital-to-analog converters and dynamic compression units. The signal transformation block 5 is implemented so that $C_j$ is signal transformed before being received by the discrete-time neural network 2a, and so that $B_j$ is signal transformed before being received by the continuous-time neural network 1a. The transformation block 7 is realized by one or more signal processors using a function table that implements step 4 of the algorithm. Preferably, the signal transformation block 5 and the transformation block 7 are integrated into a single transformation unit (not shown). The continuous-time neural network 1a and the discrete-time neural network 2a are controlled by control unit 11a and control unit 12a, respectively.

Figure 3:
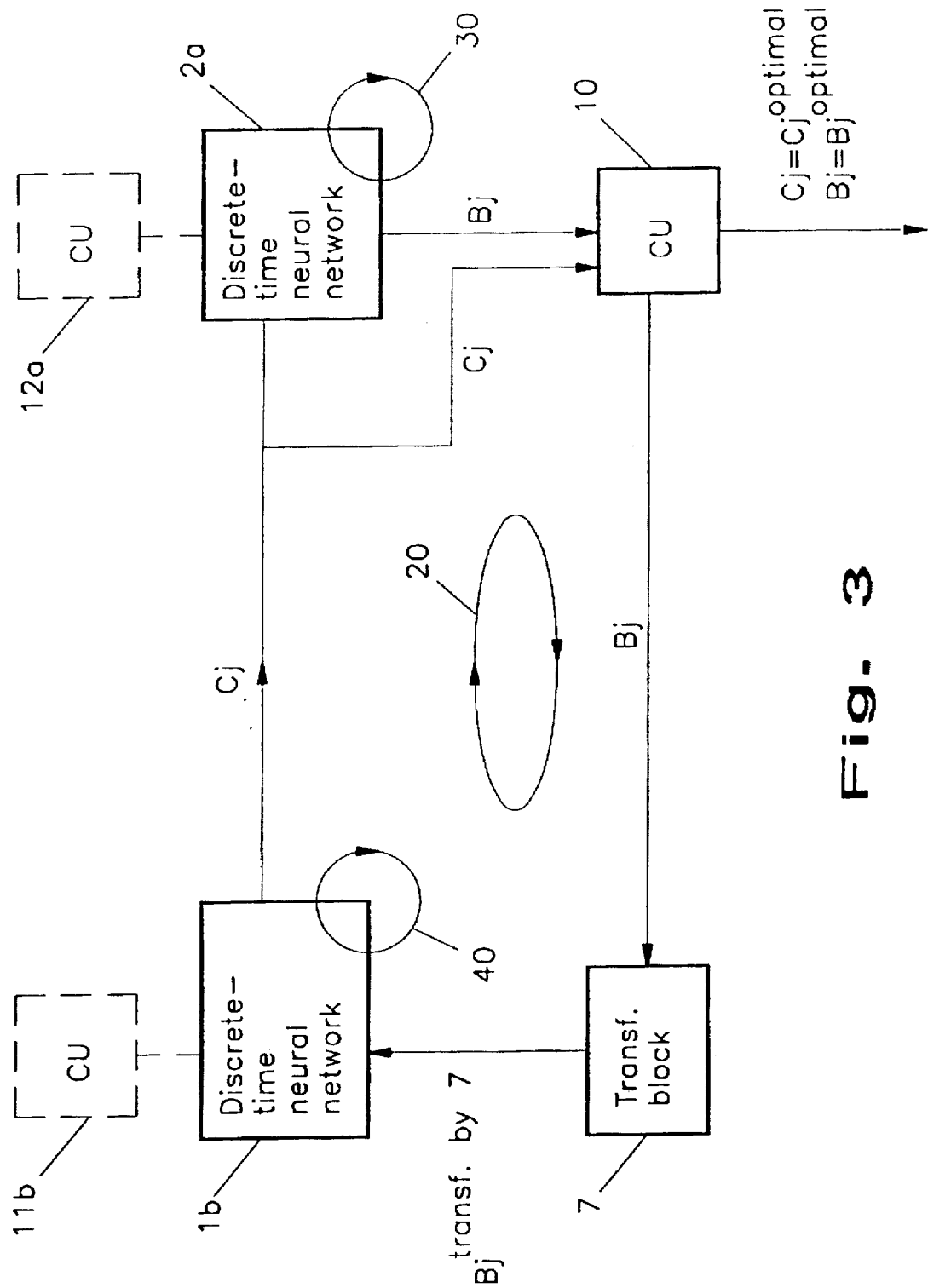
FIG. 3 is a block diagram of a second preferred embodiment of the present invention.

FIG. 3 is a block diagram, similar to FIG. 1, illustrating a second preferred embodiment of the present invention. In accordance with the invention the first neural network 1 is a discrete-time neural network 1b operating on a linear programming task, and the second neural network 2 is a discrete-time neural network 2a solving a non-linear recursive system of equations. Since two discrete-time neural networks are interworking, the signal transformation block 5 is not required and is therefore omitted. However, the transformation block 7 operates in the same way as above. The discrete-time neural network 1b and the discrete-time neural network 2a are controlled by control unit 11b and control unit 12a, respectively. Preferably, the two discrete-time neural networks are operating iteratively to execute its respective programming task (indicated by circular arrows). In particular a iteration process 40 takes place in the neural network 1b in order to compute the set of logical link capacities $C_j$ before sending it to the neural network 2a where the set of link blocking probabilities is computed in the iteration process 30 using the received set of logical link capacities $C_j$. In addition, the interworking discrete-time neural networks operate alternately in an iterative way as generally described above in connection with FIG. 1 and as indicated by the loop at 20.

Consequently, the implementation of said algorithm into neural networks of which at least one is a discrete-time neural network, involves iteration processes on two levels.

Figure 4:
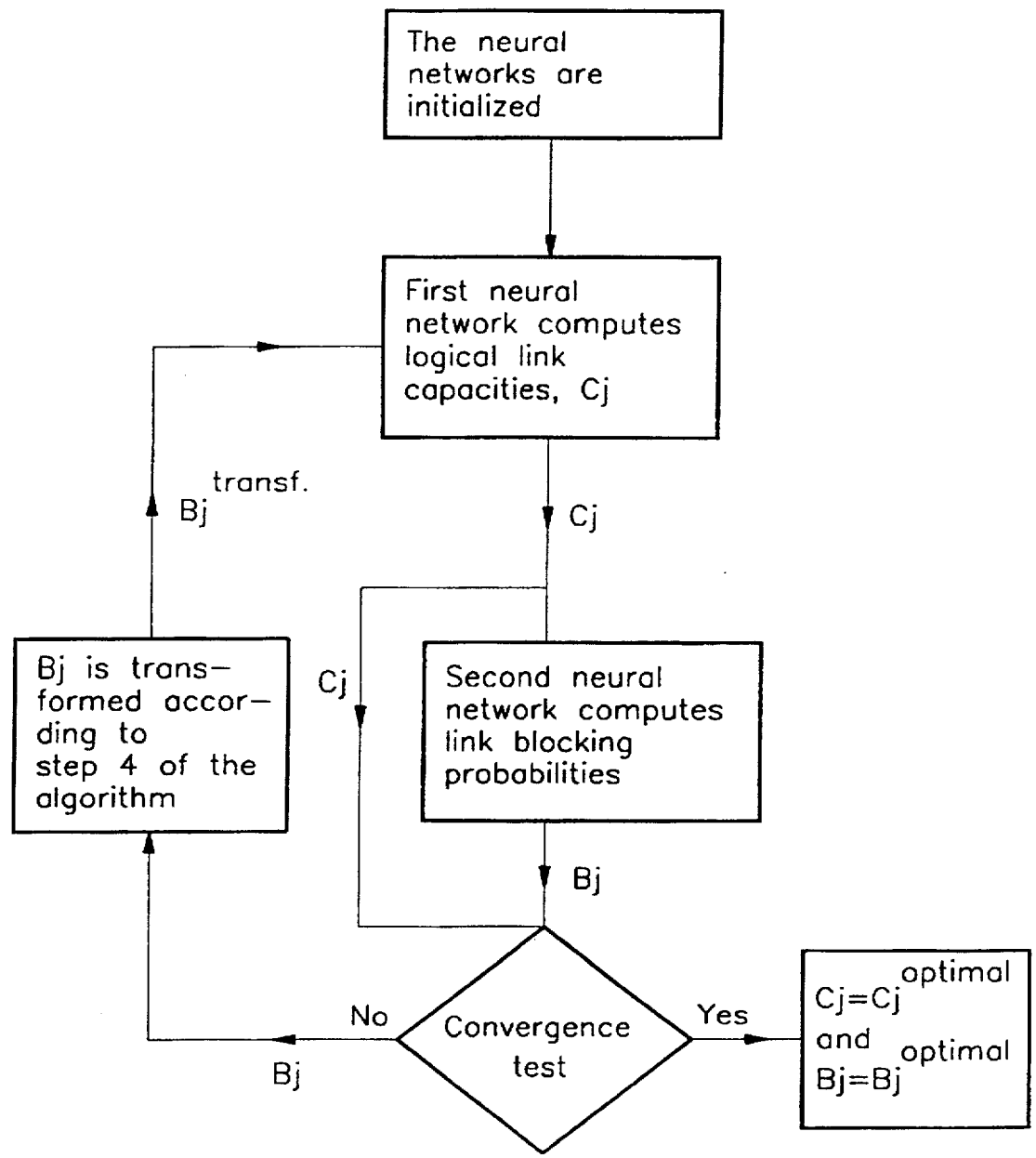
FIG. 4 is a flow diagram illustrating a method of the present invention.

A method according to the present invention is illustrated in the flow diagram of FIG. 4. In accordance with the invention the proposed method computes optimal logical link capacities in an iterative manner. At first, the first neural network 1 and the second neural network 2 are initialized. Then, the first neural network 1 operates on said one part of said algorithm so as to compute logical link capacities $C_j$. These computed logical link capacities $C_j$ are sent to the second neural network 2. The second neural network 2 operates on said second part of said algorithm using the received logical link capacities to compute link blocking probabilities $B_j$. These computed link blocking probabilities are sent together with the logical link capacities $C_j$ computed by the first neural network 1 to the main control unit 10. The main control unit 10 performs a convergence test. If the convergence conditions are satisfied (YES) then the logical link capacities q computed by the first neural network 1 essentially and globally optimize the operation of said physical network according to an objective function. In addition, the link blocking probabilities $B_j$ computed by the second neural network 2 are the link blocking probabilities with respect to these so-called optimal logical link capacities. If the convergence conditions are not satisfied (NO) then the link blocking probabilities $B_j$ are sent to a transformation block 7 and transformed according to step 4 of said algorithm. Next, said transformed link blocking probabilities are sent to the first neural network 1, and the iteration process continues, i.e. the two neural networks operate alternately, until optimal logical link capacities are closely approximated.

If a continuous-time neural network and a discrete-time neural network are interworking the method according to the invention will further comprise performing suitable transformations of the signals between the two neural networks. These signal transformations are accomplished by the transformation block 5 as described above.

Figure 5:
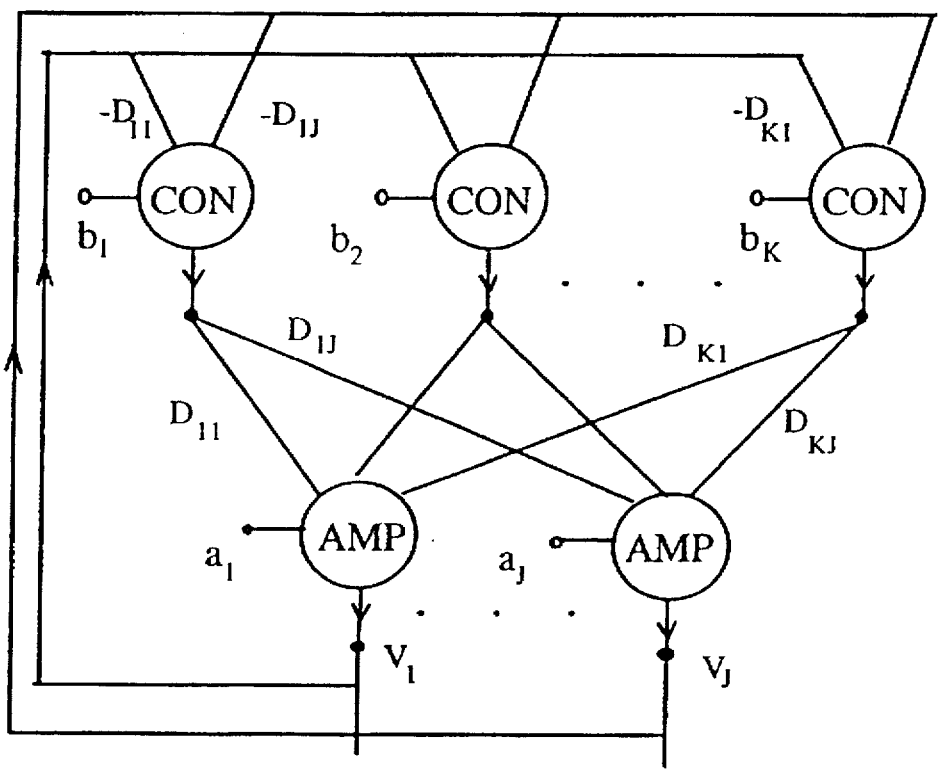
FIG. 5 illustrates the architecture of the known so called linear programming neural network presented by Hopfield and Tank.

FIG. 5 illustrates the architecture of the known so called linear programming neural network presented first by J. J. Hopfield and D. W. Tank in the article entitled "Simple neural optimization networks", IEEE Trans. on Circuits and Systems, vol. CAS-33, pp. 533–541, no. May 5, 1986. This neural network is a continuous-time dynamic feedback system, the main feature of which is that it consists of simple interconnected analogue processors called neurons. The neurons are arranged in two layers, referred to as an upper layer and a lower layer. The state variables of this neural network change continuously and simultaneously converging to a stable state.

Figure 6:
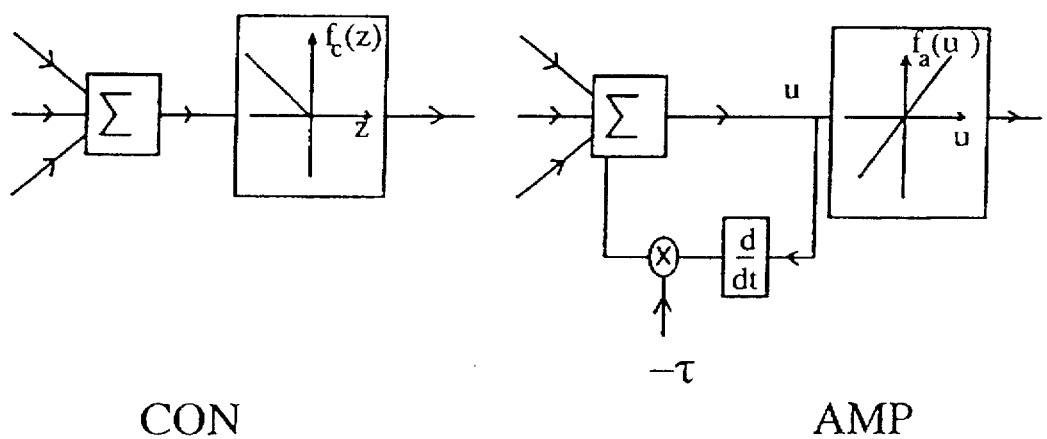
FIG. 6 shows the internal structure of the CON and AMP neurons of the neural network of FIG. 5.

In FIG. 6 there is shown the internal structure of the neurons of the continuous-time linear programming neural network shown in FIG. 5. The neurons of the upper layer, called CON neurons perform a weighted sum of all its inputs. The resulting sum is subjected to a threshold operation, according to the following function:

$$f_c(z)=0 \text{ if } z \geq 0, \text{ otherwise } f_c(z)=-z.$$

The neurons of the lower layer, denoted AMP neurons also perform a weighted sum of all its inputs, and the resulting sum subjected to a threshold operation, according to another function:

$$f(u)=u.$$

In the AMP neuron there is also a special local feedback, realizing a time-derivative operation and a multiplication with a time constant, −τ.

Hopfield and Tank have shown that this neural network is capable of solving a general linear programming problem stated as a minimization:

$$\text{Minimize } AV,$$

where A is an N-dimensional vector of weight coefficients for the N variables which are the components of the vector V. This minimization is subjected to a set of M linear constraints:

$$D_k V \geq b_k, k=1 \ldots M,$$

where $D_k$ are vectors with real number entries in the set of inequalities of the general linear programming task, and $b_k$ are the bounds. This general task is redefined in the following way:

$$\text{Maximize } \Sigma a_j V_j, j=1 \ldots J \quad (4)$$

subject to $D_k V \leq b_k$, k=1 ... K, where $a_j$ are weight values in the linear programming task, and $V_j$ the variables to be maximized. V is the vector of the variables $V_j$. $D_k$ are vectors with real number entries in the set of inequalities of the general linear programming task. These real numbers act as input weights to the neural network. Furthermore, $b_k$ are the upper bounds in the set of constraint inequalities above. Accordingly there are J output variables and K constraints, the k:th CON neuron being responsible for the fulfillment of the k:th constraint. The system of equations which govern the operation of the neural network can be written as:

$$\tau \frac{d}{dt} u_j = a_j - u_j + \sum_k D_{kj} f_c(v_k) \quad (5)$$

$$v_k = -D_k V + b_k$$

In an article entitled "Unifying the Tank and Hopfield Linear Programming Circuit and the Canonical Non-linear Programming Circuit of Chua and Lin" by M. P. Kennedy and L. Chua, IEEE Trans. on Circuits and Systems, vol. CAS-34, no. 2, Feb. 1987 it is suggested to perform the threshold operation in the CON neurons according to the function $f_c(z)=0$ if $z \geq 0$, otherwise $f_c(z)=z$, instead of the function $f_c(z)=0$ if $z \geq 0$, otherwise $f_c(z)=-z$. This way of modifying the Tank and Hopfield neural network is used in the present invention.

The linear task in step 2 of the Erlang fixed point algorithm above is similar to that formulated above in (4). The difference is that in step 2 of the EFP-algorithm $C \geq 0$ constitutes an additional constraint for the logical link capacities.

In accordance with the present invention, the linear programming neural network presented first by Hopfield and Tank is further modified in order to solve the linear task in step 2 of the EFP-algorithm. One way of modification is to include $-C \leq 0$ into the set of constraint inequalities. However, this solution would require further CON neurons, thus increasing the computational complexity of the neural network. A more practical approach is to change the AMP neuron so that its outputs cannot take negative values. This is obtained by performing the threshold operation in the AMP neurons according to the function $f(u)=u$ if $u \geq 0$, otherwise $f(u)=0$, instead of the function $f(u)=u$.

No training of the modified linear neural network is required since the weights of the neural network, given by the matrix S, are known in advance. The physical constraint values, $C_{phys}$ are received by the respective CON neurons as input values. A value of $a_j$ for each j is received by the respective AMP neuron and is considered to form an additional external input. In accordance with the invention, this modified linear programming neural network is initialized, preferably by applying zero values as input to the CON neurons. Next, the modified linear programming neural network is allowed to relax to its stable state, and a set of logical link capacities are extracted as output values. However, as pointed out above this set of logical link capacities is not, in general, the optimal one, unless the correct link blocking probabilities are known.

Following the EFP-algorithm, given the set of logical link capacities computed in step 2 above, new values for the link blocking probabilities for each j should be computed, using the Erlang fixed point equations. As pointed out above, this leads to the task of solving a complicated nonlinear recursive system of equations.

As mentioned above, in 1993, A. Faragó proposed a two-layered discrete-time neural structure with feedback for computing link blocking probabilities, given route-offered traffic rates and logical link capacities. It has been shown that this neural structure called the Link Blocking Computing Neural Network (LBCN) can solve the Erlang fixed point equations. It is possible to prove analytically that, if the logical link capacities are fixed, the LBCN converges to the unique solution of the Erlang fixed point equations.

Figure 7:
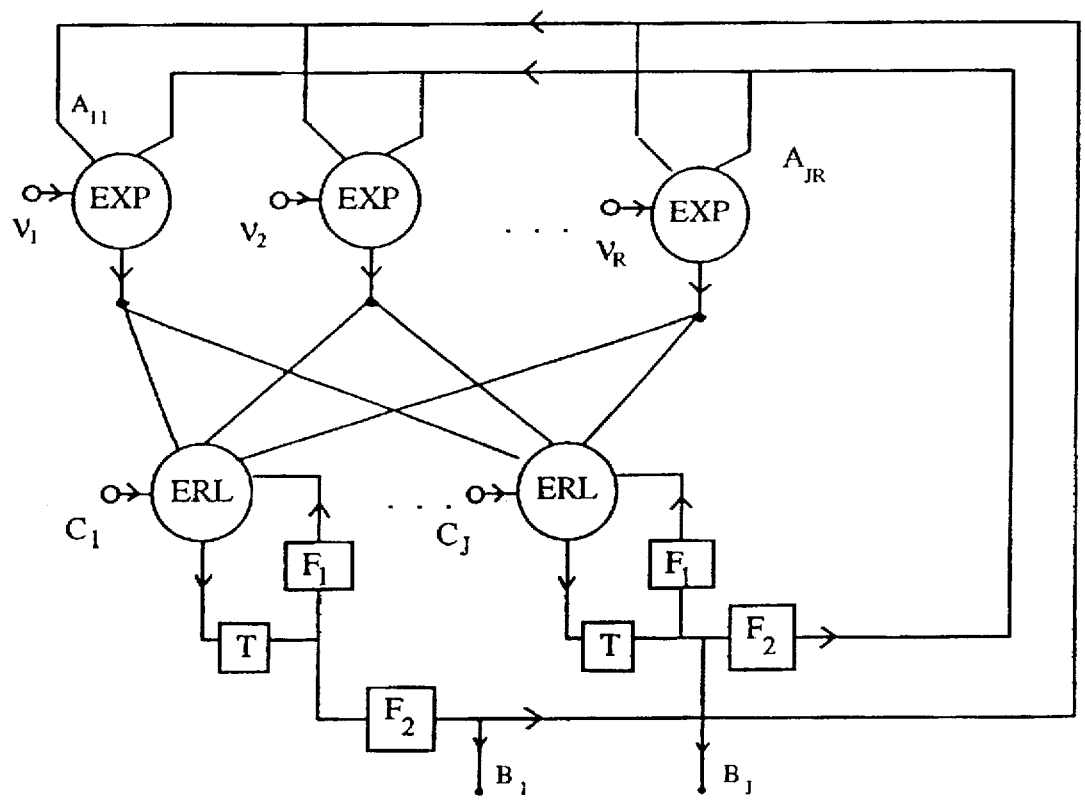
FIG. 7 illustrates the architecture of the known link blocking computing neural network (LBCN) proposed by Faragó.

FIG. 7 illustrates the Link Blocking Computing Neural Network. It comprises two layers of neurons, of which the upper layer consists of exponential neurons, denoted EXP neurons, and the lower layer consists of so called Erlang neurons, ERL neurons.

The EXP neuron realizes the nonlinear function:

$f(x, v_r) = v_r \min(\exp(x), 1)$, where $v_r$ is the offered traffic for route r and x is the weighted input sum. There is one EXP neuron for each considered route in the network, and the EXP neurons receive the offered traffic rates $v_r$ as external input values. The input weight $A_{jr}$ is the required capacity of link j by a call on route r. In the ERL neuron, after the summing block, a sigmoid type nonlinearity is expressed by Erlang's formula including an additional control parameter or threshold value, $\alpha$. There is one ERL neuron for each logical link, and every ERL neuron has an input for each of the EXP neurons that are associated to routes which contain the link. The input weights are preferably 1 for all ERL neurons, and at each ERL neuron, there is a local feedback implemented, requiring an additional auxiliary function:

$F_1(x) = 1/(1-x)$.

The additional control parameter or threshold value, $\alpha$, is obtained from the output via the transformation $F_1$. The discrete-time operation of the neural network is realized by a time-delay operator denoted T. The ERL neurons receive the corresponding logical link capacities $C_j$ as external input values.

The operation of the LBCN begins with zero values being fed to the inputs of the EXP neurons. Then, the LBCN computes new values iteratively due to the fact that the output of the ERL neurons is fed back to the input of the EXP neurons, via the second auxiliary function:

$F_2 = \log(1-x)$.

The output values of the LBCN are the link blocking probabilities with respect to the logical link capacities that are used as external input values for the ERL neurons. These link blocking probabilities are denoted $B_1, \ldots, B_j$. However, note that the obtained link blocking probabilities are not, in general, the link blocking probabilities with respect to the optimal capacities.

In accordance with said first preferred embodiment of the present invention there is provided a device for distributing resources of a given physical network among logical links by subdividing physical link capacities into said logical links using the EFP-algorithm described above, which as input has parameters describing the physical network, the topology of said logical links and traffic demands, comprising the modified linear programming neural network 1a, k in which step 2 of the EFP-algorithm is implemented, and the Link Blocking Computing Neural Network 2a, in which step 3 of the EFP-algorithm is implemented, said neural networks interworking to compute logical link capacities so that the operation of said physical network, given the modified objective function, is generally optimized, according to said modified objective function.

In addition, the link blocking probabilities with respect to the essentially optimal logical link capacities are computed at the same time. If one or some of the link blocking probabilities are very high it would be possible to reconfigure the logical link capacities in order to reduce these very high link blocking probabilities.

Preferably, the modified linear programming neural network 1a and the LBCN 2a are interworking in an iterative way, in which the two neural networks operate alternately, according to the EFP-algorithm, until the optimal logical link capacities are closely approximated. Since a continuous-time neural network, the modified linear programming neural network 1a, is interworking with a discrete-time neural network, the LBCN 2a, suitable signal transformations are required. As mentioned above, these signal transformations are accomplished in a known manner. In addition to the fact that said neural networks are extremely fast in solving, in a parallel way, their respective tasks, by allowing said neural networks to operate alternately in an iterative way, the speed of operation of the algorithm is considerably increased in comparison to traditional methods.

According to the present invention, there is an additional control unit, the main control unit 10, implementing step 5 of the EFP-algorithm, which stops the alternating operation of the two interworking neural networks, when the convergence conditions are satisfied. The modified linear programming neural network is controlled by a first control unit 11a, possibly incorporated into the main control unit 10. There is a also second control unit 12a, which may be included in the main control unit 10, stopping the iteration process of the LBCN, when a convergence condition is satisfied.

For a better understanding of the present invention, the interaction between the two neural networks will now be described in more detail. At first, the modified linear programming neural network 1a and the LBCN 2a are initialized. Then the modified linear programming neural network 1a completely solves the linear programming task in step 2 of the EFP-algorithm, thereby computing a set of logical link capacities. These computed logical link capacities are sent, after suitable signal transformations performed by the signal transformation block 5, to the LBCN 2a, which solves the Erlang fixed point equations of step 3 of the EFP-algorithm. A set of link blocking probabilities are extracted from the LBCN. Then, a convergence test is carried out by the control unit 10. If the convergence conditions are not satisfied, the link blocking probabilities are transformed according to step 4 of the EFP-algorithm, and then sent, after suitable signal transformations performed by the block 5, to the modified linear programming neural network 1a and the EFP-algorithm is repeated from step 2. This will lead to the computation of a new set of logical link capacities and subsequently also of a new set of link blocking probabilities. However, if the convergence conditions are satisfied, the logical link capacities computed by the modified linear programming neural network 1a closely approximates the optimal logical link capacities.

Of course, as will be understood by those skilled in the art, it is possible to begin the iteration process by allowing the LBCN 2a to compute a set of link blocking probabilities, which is then sent, after suitable signal transformations, to the modified linear programming neural network 1a. In all other regards the iteration process is similar to the one above and proceeds until optimal logical link capacities are closely approximated.

In accordance with the present invention a more efficient approach is proposed, in which the LBCN 2a executes only one or a few iterations in its programming task. The number of iterations executed by the LBCN 2a is preferably controlled by the second control unit 12a mentioned above. Consequently, the modified linear programming network 1a still completely solves the linear programming task before handing over the result to the LBCN 2a, which in turn executes only one or possibly a few iterations in its task before it hands back its result to the modified linear programming network 1a. This goes on until convergence is achieved with a required level of accuracy. This way of computing the solution leads to a first modification of the original EFP-algorithm. This first modified EFP-algorithm is of course very closely related to the original one. The link blocking probabilities computed in step 3 of said first modified EFP-algorithm are not the fixed point link blocking probabilities, but only an approximation of these. Although the convergence may be somewhat slower, the computational complexity of step 3 of said first modified algorithm is smaller than the corresponding step of the original algorithm.

Figure 8:
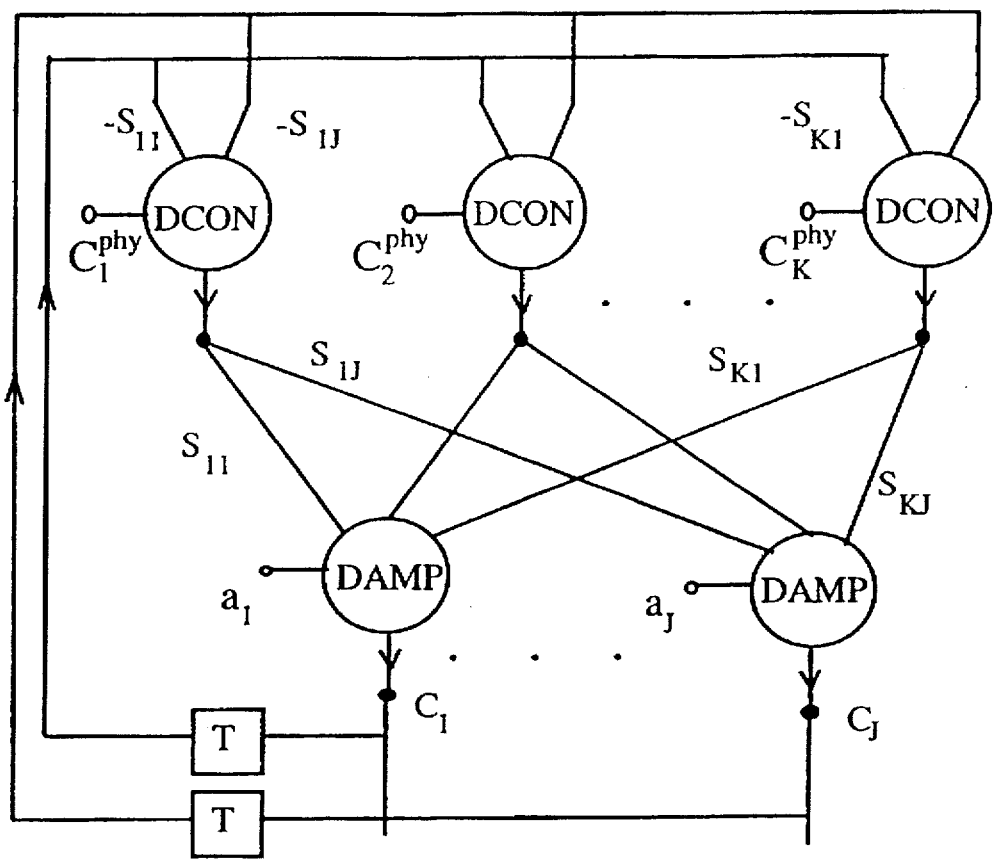
FIG. 8 illustrates the architecture of a discrete-time linear programming neural network (DLPN) according to the present invention.
Figure 9:
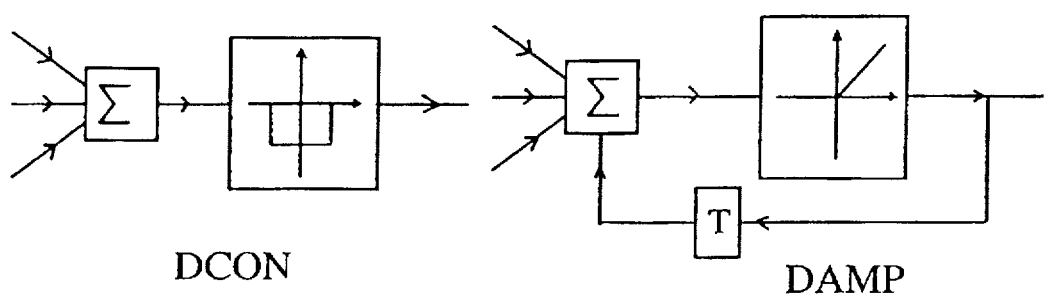
FIG. 9 shows the internal structure of the DCON and DAMP neurons of the neural network of FIG. 8.

FIG. 8 illustrates, in accordance with the invention, the architecture of the proposed discrete-time linear programming neural network (DLPN) for solving the linear programming task in step 2 of the EFP-algorithm. The architecture is similar to the one of the continuous-time modified linear programming neural network 1a above, but time-delay operators denoted T are included to assure the discrete-time operation of the proposed neural network. Accordingly, interconnected neurons are arranged in two layers, referred to as an upper layer and a lower layer. The DLPN 1b is not a direct discrete-time simulation of the continuous-time modified linear programming neural network 1a, since this would yield valid solutions only by using an approximation of the system of differential equations (5). In the direct discrete-time simulation the number of iterations is unacceptably high, so instead, by applying a modified constraint function a better trade-off between speed and accuracy is obtained. The important difference in comparison to the continuous-time modified linear programming neural network 1a lies in the constraint function realized by the neurons of the upper layer, denoted DCON neurons (FIG. 9):

$$f(z)[H(z+a) - H(z-a)] = \begin{array}{l} 0, z < -a \\ f(z), -a < z < a \\ 0, z > a, \end{array}$$

where $H(z)$ is Heaviside's step function, $a > 0$, and $f(z) = -2a$. The DCON neurons perform a weighted sum of all its inputs, the result of which is subjected to a threshold operation, according to the above constraint function. The neurons of the lower layer, denoted DAMP neurons also perform a weighted sum of all its inputs, and then performs a threshold operation on the weighted sum, according to another function:

$f_2(z)=0$ if $z \leq 0$, otherwise $f_2(z)=z$.

In the DAMP neuron there is also a local and time-delayed feedback.

No training of the discrete-time linear programming neural network 1b is required since the weights of the neural network, given by the matrix S, are known in advance. The physical constraint values, $C_{phys}$ are received by the respective DCON neurons as external input values. A value of $a_j$ for each j is received by the respective DAMP neuron and considered as an additional external input. The discrete-time linear programming neural network 1b is initialized, and because the output of the DAMP neurons is fed back to the input of the DCON neurons the DLPN 1b iteratively computes new values of the logical link capacities. Of course, the set of extracted logical link capacities is the optimal one only if the correct link blocking probabilities are known. Preferably, a control unit 11b is used to control the iteration process of the DLPN, i.e. to stop the iteration process when the approximated modified objective function ceases to increase.

Consequently, and in accordance with said second preferred embodiment of the present invention, the modified linear programming neural network 1a is substituted by the DLPN 1b, in which step 2 of the EFP-algorithm is implemented. Accordingly the DLPN 1b and the LBCN 2a interwork in an iterative way, in which said two neural networks operate alternately according to the EFP-algorithm, in order to compute logical link capacities so that the operation of the physical network, given the approximated modified objective function, is generally optimized, according to the approximated modified objective function.

Of course, appropriate control units 10, 11b, 12a and a signal transformation block 7 for implementing step 4 of the EFP-algorithm are used to realize the interworking of the two discrete-time neural networks.

In an alternative embodiment of the present invention only one control unit 10 is used to control both the interworking between the currently used neural networks, and the iteration process of the discrete-time neural network/networks.

Still another possible way of further increasing the operation speed of the algorithm is to let the two discrete-time neural networks, i.e. the DLPN 1b and the LBCN 2a, execute only one or possibly a few iteration steps in their respective programming tasks. Consequently, the DLPN executes one iteration in its linear programming task and hands over the result to the LBCN, which in turn also executes only one iteration before it hands back its result to the DLPN. This alternating operation of the two interworking neural networks goes on until convergence is achieved with a required level of accuracy. This way of computing the solution leads to still another modification of the original EFP-algorithm. Naturally, the inherent computational complexity of this second modified EFP-algorithm is considerably reduced. Note that the implementation of the EFP-algorithm into neural networks usually involves iteration processes on two levels. First, any discrete-time neural network solves its respective programming task iteratively. In addition, the interworking neural networks operate alternately in an iterative way.

Possible neural network configurations and ways of computing the essentially optimal logical link capacities are briefly summarized in the following:

a) The modified continuous-time linear programming neural network and the discrete-time link blocking computing neural network (LBCN) are interworking according to the original EFP-algorithm.
b) The discrete-time linear programming neural network and the discrete-time LBCN are interworking according to the original EFP-algorithm.
c) The modified continuous-time linear programming neural network and the discrete-time LBCN, the LBCN executing only one or possibly a few iterations, are interworking according to the first modified EFP-algorithm.
d) The discrete-time linear programming neural network and the discrete-time LBCN, the LBCN executing only one or possibly a few iterations, are interworking according to the first modified EFP-algorithm.
e) The discrete-time linear programming neural network (DLPN), and the discrete-time LBCN, both the LBCN and the DLPN executing only one or possibly a few iterations, are interworking according to the second modified EFP-algorithm.

A hardware implementation of the present invention is realized by using conventional electronic equipment. Accordingly, it is possible to reconfigure the logical link capacities in real-time according to said computed logical link capacities, so that a combination of total carried traffic and link utilization in said physical network is essentially maximized. This, in turn, renders the operation of the complete physical network both safe and flexible.

The embodiments described above are merely given as examples, and it should be understood that the present invention is not limited thereto. It is of course possible to embody the invention in specific forms other than those described without departing from the spirit of the present invention. For instance, the input of the algorithm may comprise parameters describing traffic classes. Also, other algorithms than the EFP-algorithm, preferably formulated as constrained maximizations or minimizations, may be used. Further modifications and improvements which retain the basic underlying principles disclosed and claimed herein are within the scope and spirit of the present invention.

Simulation results

The DLPN has been applied to several linear programming problems. For comparison solutions have also been computed with traditional methods in order to verify the results given by the DLPN. The verification has always been positive. In one specific linear programming problem there were 17 variables with 15 constraints, and to reach the solution the DLPN needed 950 iteration steps on the average, plus 200 overhead steps to detect that the linear objective function had stopped increasing.

Considering the first modified EFP-algorithm, being implemented into two interworking discrete-time neural networks (case (d) above), the speed of operation is increased by at least a factor J in comparison to traditional methods (note that J are the number of logical links in the complete network).

In the case of small telecommunication networks (4 nodes, 16 logical links) both the first modified EFP, which is implemented into two discrete-time neural networks, and the second modified EFP, also being implemented in two discrete-time neural networks (case (e) above), converge very fast. Convergence is achieved within 15 iterations with an error bound of 0.0001. For larger telecommunication networks (6 nodes, 80 logical links) the second modified EFP (e) shows a slower convergence, about 50 iterations, but is compensated by the simplicity of the linear programming task compared to the first modified EFP (d).

During simulations it was observed that the computing of the new set of link blocking probabilities took significant part of the total iteration time. Consequently, it is considered more favorable to let the LBCN execute only one iteration step in its programming task rather than allowing the LBCN to converge to the fixed point solution, i.e. the fixed point link blocking probabilities. It is of course possible to let the DLPN execute only one iteration in its programming task and let the LBCN converge to the fixed point link blocking probabilities, thus obtaining yet another modification of the EFP-algorithm. However, this is not the most practical approach, although it might be faster than the original EFP-algorithm.

We claim:

1. A device for determining a distribution of resources of a given physical network among logical links by subdividing physical link capacities into said logical links using an algorithm, comprising:

first neural network means, in which one part of the algorithm is implemented; and second neural network means, in which a second part of the algorithm is implemented, said first and second neural network means interworking to compute logical link capacities, wherein said first neural network means comprises interconnected neuron means that are arranged in two layers, referred to as an upper layer and a lower layer, wherein said first neural network means is an analogue neural network, operating continuously on said one part of the algorithm, and wherein said first neural network means is a linear programming neural network of Hopfield type, and neural structure and the neuron means of which are adapted to said one part of the algorithm.

2. A device in accordance with claim 1, in which each neuron means of said upper layer performs a weighted sum of all its inputs, the result being a first summed signal, and then performs a neural threshold operation on said first summed signal according to a constraint function so defined that $$f_c(z)=0 \text{ if } z \geq 0, \text{ otherwise } f_c(z)=z,$$

and in which each neuron means of said lower layer performs a weighted sum of all its inputs, the result being a second summed signal, each neuron means of said lower layer feeding back said second summed signal being subjected to a time-derivative operation and a multiplication with a time constant, as a local input to itself, and performs a neural threshold operation on said second summed signal, wherein said neural threshold operation on said second summed signal is performed according to another function $$f(u)=u \text{ if } u \geq 0, \text{ otherwise } f(u)=0.$$

3. A device for determining a distribution of resources of a given physical network among logical links by subdividing physical link capacities into said logical links using an algorithm, comprising:

first neural network means, in which one part of the algorithm is implemented; and second neural network means, in which a second part of the algorithm is implemented, said first and second neural network means interworking to compute logical link capacities, wherein said first neural network means comprises interconnected neuron means that are arranged in two layers, referred to as an upper layer and a lower layer, wherein said first neural network means is a discrete-time linear programming neural network, operating on said one part of the algorithm.

4. A device in accordance with claim 3, wherein said device further comprises first additional control means for stopping the iteration process of the discrete-time linear programming neural network, when a certain condition is satisfied.

5. A device in accordance with claim 3, in which each neuron means of said upper layer performs a weighted sum of all its inputs, the result being a first summed signal, and then performs a neural threshold operation on said first summed signal, and in which each neuron means of said lower layer performs a weighted sum of all its inputs, the result being a second summed signal, and then performs a neural threshold operation on said second summed signal, wherein said neural threshold operation on said first summed signal is performed according to a constraint function so defined that $$f(z)[H(z+a)-H(z-a)] = \begin{cases} 0, & z<-a \\ f(z), & -a<z<a \\ 0, & z>a, \end{cases}$$

where $H(z)$ is Heaviside's step function, $a>0$, and $f(z)=-2a$, and wherein said neural threshold operation on said second summed signal is performed according to another constraint function $$f_2(z)=0 \text{ if } z \leq 0, \text{ otherwise } f_2(z)=z,$$

and wherein each output of the neuron means of said lower layer is being fed back, with a time delay, as a local input to the respective neuron means of said lower layer.

6. A device for determining a distribution of resources of a given physical network among logical links by subdividing physical link capacities into said logical links using an algorithm, comprising:

first neural network means, in which one part of the algorithm is implemented; and second neural network means, in which a second part of the algorithm is implemented, said first and second neural network means interworking to compute logical link capacities, wherein said second neural network means comprises interconnected neuron means that are arranged in two layers, referred to as an upper layer and a lower layer, wherein said second neural network means is a discrete-time neural network, operating on said second part of the algorithm, and wherein said discrete-time neural network is a link blocking computing neural network (LBCN).

7. A neural network comprising interconnected neuron means that are arranged in two layers, referred to as an upper layer and a lower layer, in which each neuron means of said upper layer performs a weighted sum of all its inputs, the result being a first summed signal, and then performs a neural threshold operation on said first summed signal, and in which each neuron means of said lower layer performs a weighted sum of all its inputs, the result being a second summed signal, and then performs a neural threshold operation on said second summed signal, wherein said neural threshold operation on said first summed signal is performed according to a constraint function so defined that $$f(z)[H(z+a)-H(z-a)] = \begin{cases} 0, z < -a \\ f(z), -a < z < a \\ 0, z > a, \end{cases}$$

where $H(z)$ is Heaviside's step function, $a>0$, and $F(z)=-2a$, and wherein said neural threshold operation on said second summed signal is performed according to another constraint function $$f_2(z)=0 \text{ if } z \leq 0, \text{ otherwise } f_2(z)=z,$$

and wherein each output of the neuron means of said lower layer is being fed back, with a time delay, as a local input to the respective neuron means of said lower layer.

8. A method for determining a distribution of resources of a given physical network among logical links by subdividing physical link capacities into said logical links using an algorithm, wherein said method further comprises the steps of:

using first neural network means, in which one part of said algorithm is implemented, and second neural network means, in which a second part of said algorithm is implemented; and bringing said first and second neural network means to interwork in order to compute logical link capacities whereby the operation of said physical network, given an objective function, is generally optimized according to said objective function, wherein said algorithm as input has parameters describing the physical network, the topology of said logical links and traffic demands, and wherein said inter-working between said first neural network means, being a continuous-time linear programming neural network, and said second neural network means, being a discrete-time neural network, is an iterative process which comprises the following steps:
(1) said first neural network means and said second neural network means are initialized,
(2) said first neural network means completely solves a linear programming task, thereby computing logical link capacities,
(3) said logical link capacities, computed in step (2), are sent, after suitable signal transformations, to said second neural network means,
(4) said second neural network means solves a non-linear recursive system of equations, thereby computing link blocking probabilities,
(5) a convergence test is carried out, and if the convergence conditions are not satisfied, said computed link blocking probabilities are transformed according to a function of said algorithm, and then sent, after suitable signal transformations, to said first neural network means and the steps (2)-(5) are repeated, while if the convergence conditions are satisfied, said logical link capacities computed by said first neural network means in step (2) are the logical link capacities that essentially optimize the operation of the physical network, according to said objective function.

9. A method for determining a distribution of resources of a given physical network among logical links by subdividing physical link capacities into said logical links using an algorithm, wherein said method further comprises the steps of:

using first neural network means, in which one part of said algorithm is implemented, and second neural network means, in which a second part of said algorithm is implemented; and bringing said first and second neural network means to interwork in order to compute logical link capacities whereby the operation of said physical network, given an objective function, is generally optimized according to said objective function, wherein said algorithm as input has parameters describing the physical network, the topology of said logical links and traffic demands, and wherein said inter-working between said first neural network means, being a continuous-time linear programming neural network, and said second neural network means, being a discrete-time neural network, is an iterative process which comprises the following steps:
(1) said first neural network means and said second neural network means are initialized,
(2) said first neural network means completely solves a linear programming task, thereby computing logical link capacities,
(3) said logical link capacities, computed in step (2), are sent, after suitable signal transformations, to said second neural network means,
(4) said second neural network means executes one iteration in a non-linear recursive programming task, thereby computing link blocking probabilities,
(5) a convergence test is carried out, and if the convergence conditions are not satisfied, said computed link blocking probabilities are transformed according to a function of said algorithm, and then sent, after suitable signal transformations, to said first neural network means and the steps (2)-(5) are repeated, while if the convergence conditions are satisfied, said logical link capacities computed by said first neural network means in step (2) are the logical link capacities that essentially optimize the operation of the physical network, according to said objective function.

10. A method for determining a distribution of resources of a given physical network among logical links by subdividing physical link capacities into said logical links using an algorithm, wherein said method further comprises the steps of:

using first neural network means, in which one part of said algorithm is implemented, and second neural network means, in which a second part of said algorithm is implemented; and bringing said first and second neural network means to interwork in order to compute logical link capacities whereby the operation of said physical network, given an objective function, is generally optimized according to said objective function, wherein said algorithm as input has parameters describing the physical network, the topology of said logical links and traffic demands, and wherein said inter-working between said first neural network means, being a continuous-time linear programming neural network, and said second neural network means, being a discrete-time neural network, is an iterative process which comprises the following steps:
(1) said first neural network means and said second neural network means are initialized,
(2) said first neural network means executed one iteration in a linear programming task, thereby computing logical link capacities, (3) said logical link capacities, computed in step (2), are sent to said second neural network means, (4) said second neural network means executes one iteration in a non-linear recursive programming task, thereby computing link blocking probabilities, (5) a convergence test is carried out, and if the convergence conditions are not satisfied, said computed link blocking probabilities are transformed according to a function of said algorithm, and then sent to said first neural network means and the steps (2)-(5) are repeated, while if the convergence conditions are satisfied, said logical link capacities computed by said first neural network means in step (2) are the logical link capacities that essentially optimize the operation of the physical network, according to said objective function.

11. A device for determining a distribution of resources of a given physical network among logical links by subdividing physical link capacities into said logical links, comprising a neural network configuration that comprises:

a first individual neural network, in which a first part of a predetermined logical link capacity optimization algorithm is implemented for generating a first result;

a second individual neural network, in which a second part of said algorithm is implemented for generating a second result;

means for mutually interconnecting said first neural network and said second neural network, wherein a representation of said first result is transferred by said interconnecting means to said second neural network, and a representation of said second result is transferred by said interconnecting means to said first neural network such that said first neural network and said second neural network are mutually interworking in an iterative manner to compute capacity values of said logical links; and a control unit for stopping the iterative and mutual interworking of said first neural network and said second neural network when a predetermined condition is satisfied.

12. A device in accordance with claim 11, wherein said first neural network and said second neural network are neural feedback systems, each of which includes interconnected neurons that are arranged into two layers, referred to as an upper layer and a lower layer, the outputs of the neurons of said lower layer being fed back to the neurons of said upper layer.

13. A device in accordance with claim 12, wherein said first neural network is an analog neural feedback system operating continuously on said first part of said algorithm, and said second neural network is a discrete-time neural feedback system operating in discrete time on said second part of said algorithm, said device further comprising:

at least one first signal transformation unit for transforming continuous-time signals from said first neural network into discrete-time signals, and for transforming discrete-time signals from said second neural network into continuous-time signals.

14. A device in accordance with claim 11, wherein said first neural network as well as said second neural network are neural feedback systems operating in discrete time on said first algorithm part and said second algorithm part, respectively.

15. A device in accordance with claim 11, further comprising:

a second transformation unit for transforming said second result according to a predetermined function given by said algorithm such as to generate said representation of said second result.

16. A device in accordance with claim 11, wherein said algorithm as input has parameters describing the physical network, the topology of said logical links and traffic demands.

17. A device in accordance with claim 11, wherein said computed logical link capacities, given an objective function, essentially optimize the operation of said physical network according to said objective function.

18. A device in accordance with claim 17, wherein the physical network has a number of routes r, and said objective function is representative of the total carried traffic in said physical network, expressed as, $$\sum_r v_r \prod_j (1 - B_j)^{A_{jr}}.$$

where $v_r$ is route traffic on route r, $B_j$ is link blocking probability on logical link j, and $A_{jr}$ is required capacity of link j by a call on route r.

19. A device in accordance with claim 18, wherein revenue coefficients are incorporated in said objective function.

20. A device in accordance with claim 11, wherein said algorithm as input has parameters describing the physical network, the topology of said logical links and traffic demands, wherein said computed logical link capacities, given an objective function, essentially optimize the operation of said physical network according to said objective function, and wherein said objective function is subjected to physical constraints given by at least one of said parameters.

21. A device in accordance with claim 11, wherein said algorithm is the Erlang Fixed Point algorithm.

22. A device in accordance with claim 11, wherein said first neural network is a linear programming neural network of Hopfield type, the neural structure and the neurons of which are adapted to said first part of said algorithm.

23. A device in accordance with claim 22, wherein said first neural network includes interconnected neurons that are arranged into two layers, referred to as an upper layer and a lower layer, in which each neuron of said upper layer performs a weighted sum of all its inputs, the result being a first summed signal, and then performs a neural threshold operation on said first summed signal according to a constraint function so defined that $$f_c(z)=0 \text{ if } z \geq 0, \text{ otherwise } f_c(z)=z,$$

and in which each neuron of said lower layer performs a weighted sum of all its inputs, the result being a second summed signal, each neuron of said lower layer feeding back said second summed signal being subjected to a time-derivative operation and a multiplication with a time constant, as a local input to itself, and performs a neural threshold operation on said second summed signal, wherein said neural threshold operation on said second summed signal is performed according to another function $$f(u)=u \text{ if } u \geq 0, \text{ otherwise } f(u)=0.$$

24. A device in accordance with claim 11, wherein said first neural network includes interconnected neurons that are arranged into two layers, referred to as an upper layer and a lower layer, and said first neural network is a discrete-time linear programming neural network, operating in discrete time on said first part of said algorithm.

25. A device in accordance with claim 24, wherein said device further comprises first additional control means for stopping the iteration process of said discrete-time linear programming neural network, when a certain condition is satisfied.

26. A device in accordance with claim 24, wherein each neuron of said upper layer performs a weighted sum of all its inputs, the result being a first summed signal, and then performs a neural threshold operation on said first summed signal, and in which each neuron of said lower layer performs a weighted sum of all its inputs, the result being a second summed signal, and then performs a neural threshold operation on said second summed signal, wherein said neural threshold operation on said first summed signal is performed according to a constraint function so defined that $$f(z)[H(z+a) - H(z-a)] = \begin{cases} 0, & z < -a \\ f(z), & -a < z < a \\ 0, & z > a, \end{cases}$$

where $H(z)$ is Heaviside's step function, $a>0$, and $f(z)=-2a$, and wherein said neural threshold operation on said second summed signal is performed according to another constraint function $$f_2(z)=0 \text{ if } z \leq 0, \text{ otherwise } f_2(z)=z,$$

and wherein each output of the neurons of said lower layer is being fed back, with a time delay, as a local input to the respective neuron of said lower layer.

27. A device in accordance with claim 26, wherein the output of the neurons of said lower layer is fed back to the input of the neurons of the upper layer.

28. A device in accordance with claim 11, wherein said second neural network is a neural feedback system which includes interconnected neurons that are arranged into two layers, referred to as an upper layer and a lower layer, the output of the neurons of the lower layer being fed back to the neurons of the upper layer, and wherein said second neural network is a discrete-time neural network, operating in discrete time on said second part of said algorithm.

29. A device in accordance with claim 28, wherein said device further comprises second additional control means for controlling the iteration process of said discrete-time neural network.

30. A device in accordance with claim 28, wherein said discrete-time neural network is a known Link Blocking Computing Neural network (LBCN).

31. A method for determining a distribution of resources of a given physical network among logical links by subdividing physical link capacities into said logical links, comprising the step of:

using a neural network configuration that includes:
a first continuous-time linear programming neural network, in which a first part of a predetermined logical link capacity optimization algorithm is implemented,
a second discrete-time neural feedback network, in which a second part of said algorithm is implemented, and
means for mutually interconnecting said first neural network and said second neural network,
wherein said first linear programming neural network and said second neural feedback network are mutually interworking in an iterative manner to compute logical link capacities, and said algorithm uses a given objective function, and said interworking comprises the steps of:

(1) initializing said first neural network and said second neural network;
(2) said first neural network completely solving a linear programming task, thereby computing logical link capacities,
(3) sending said logical link capacities, computed in step (2), after suitable signal transformations, to said second neural network,
(4) said second neural network solving a non-linear recursive system of equations, thereby computing link blocking probabilities, and
(5) performing a convergence test, and if convergence conditions are not satisfied, transforming said computed link blocking probabilities according to a function of said algorithm, and sending said transformed probabilities, after suitable signal transformations, to said first neural network and repeating steps (2)–(5), while if said convergence conditions are satisfied, said logical link capacities computed by said first neural network in step (2) are the logical link capacities that essentially optimize the operation of the physical network, according to said objective function.

32. A method for determining a distribution of resources of a given physical network among logical links by subdividing physical link capacities into said logical links, comprising the step of:

using a neural network configuration that includes:
a first continuous-time linear programming neural network, in which a first part of a predetermined logical link capacity optimization algorithm is implemented,
a second discrete-time neural feedback network, in which a second part of said algorithm is implemented, and
means for mutually interconnecting said first neural network and said second neural network,
wherein said first linear programming neural network and said second neural feedback network are mutually interworking in an iterative manner to compute logical link capacities, and said algorithm uses a given objective function, and said interworking comprises the steps of:

(1) initializing said first neural network and said second neural network;
(2) said first neural network completely solving a linear programming task, thereby computing logical link capacities,
(3) sending said logical link capacities, computed in step (2), after suitable signal transformations, to said second neural network,
(4) said second neural network executing only a few iterations in a non-linear recursive programming task, thereby computing link blocking probabilities, and
(5) performing a convergence test, and if convergence conditions are not satisfied, transforming said computed link blocking probabilities according to a function of said algorithm, and sending said transformed probabilities, after suitable signal transformations, to said first neural network and repeating steps (2)–(5), while if said convergence conditions are satisfied, said logical link capacities computed by said first neural network in step (2) are the logical link capacities that essentially optimize the operation of the physical network, according to said objective function.

33. A method for determining a distribution of resources of a given physical network among logical links by subdividing physical link capacities into said logical links, comprising the step of:

using a neural network configuration that includes:

a first discrete-time linear programming neural feedback network, in which a first part of a predetermined logical link capacity optimization algorithm is implemented, a second discrete-time neural feedback network, in which a second part of said algorithm is implemented, and means for mutually interconnecting said first neural network and said second neural network, wherein said first neural feedback network and said second neural feedback network are mutually interworking in an iterative manner to compute logical link capacities, and said algorithm uses a given objective function, and said interworking comprises the steps of:

(1) initializing said first neural network and said second neural network;

(2) said first neural network executing only a few iterations in a linear programming task, thereby computing logical link capacities, (3) sending said logical link capacities, computed in step (2) to said second neural network, (4) said second neural network executing only a few iterations in a non-linear recursive programming task, thereby computing link blocking probabilities, and (5) performing a convergence test, and if convergence conditions are not satisfied, transforming said computed link blocking probabilities according to a function of said algorithm, and sending said transformed probabilities to said first neural network and repeating steps (2)–(5), while if said convergence conditions are satisfied, said logical link capacities computed by said first neural network in step (2) are the logical link capacities that essentially optimize the operation of the physical network, according to said objective function.

* * * * *